(12) United States Patent
Pakyari et al.

(10) Patent No.: US 8,041,551 B1
(45) Date of Patent: Oct. 18, 2011

(54) ALGORITHM AND ARCHITECTURE FOR MULTI-ARGUMENT ASSOCIATIVE OPERATIONS THAT MINIMIZES THE NUMBER OF COMPONENTS USING A LATENCY OF THE COMPONENTS

(75) Inventors: Alireza Pakyari, Lexington, MA (US); Brian K. Ogilvie, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 12/642,095

(22) Filed: Dec. 18, 2009

Related U.S. Application Data

(62) Division of application No. 11/444,962, filed on May 31, 2006.

(51) Int. Cl.
*G06F 17/50* (2006.01)

(52) U.S. Cl. ......... 703/13; 716/104; 716/114; 716/103; 716/117; 703/14

(58) Field of Classification Search ............... 716/11, 716/6, 18, 5, 103, 104, 114, 117; 706/10; 703/26, 14, 27, 23, 13
See application file for complete search history.

(56) References Cited

U.S. PATENT DOCUMENTS

| | | | |
|---|---|---|---|
| 4,020,334 A | 4/1977 | Powell et al. | |
| 4,719,588 A | 1/1988 | Tatemichi et al. | |
| 4,742,552 A | 5/1988 | Andrews | |
| 4,901,229 A * | 2/1990 | Tashiro et al. | 706/10 |
| 5,021,987 A | 6/1991 | Chan et al. | |
| 5,268,856 A | 12/1993 | Wilson | |
| 5,491,650 A | 2/1996 | Barhen et al. | |
| 5,751,592 A * | 5/1998 | Takai et al. | 716/5 |
| 5,794,059 A | 8/1998 | Barker et al. | |
| 5,842,031 A | 11/1998 | Barker et al. | |
| 5,963,746 A | 10/1999 | Barker et al. | |
| 5,966,528 A | 10/1999 | Wilkinson et al. | |
| 6,094,715 A | 7/2000 | Wilkinson et al. | |
| 6,272,671 B1 * | 8/2001 | Fakhry | 716/18 |
| 6,314,194 B1 * | 11/2001 | Michael et al. | 382/113 |
| 6,377,912 B1 | 4/2002 | Sample et al. | |
| 6,470,482 B1 * | 10/2002 | Rostoker et al. | 716/6 |
| 6,769,005 B1 | 7/2004 | Ott | |
| 6,980,605 B2 | 12/2005 | Gatherer et al. | |
| 7,093,204 B2 | 8/2006 | Oktem et al. | |
| 7,146,594 B1 * | 12/2006 | Goike et al. | 716/11 |
| 2001/0007958 A1 * | 7/2001 | Mabuchi | 700/2 |
| 2002/0161568 A1 | 10/2002 | Sample et al. | |
| 2003/0097361 A1 | 5/2003 | Huang et al. | |
| 2004/0199878 A1 | 10/2004 | Oktem et al. | |
| 2004/0246025 A1 | 12/2004 | Tran et al. | |
| 2004/0249873 A1 | 12/2004 | Stark et al. | |
| 2005/0007352 A1 | 1/2005 | Nathan et al. | |
| 2005/0038937 A1 | 2/2005 | Jason et al. | |
| 2005/0105909 A1 | 5/2005 | Stone | |

(Continued)

*Primary Examiner* — Kamini S Shah
*Assistant Examiner* — Cuong Luu
(74) *Attorney, Agent, or Firm* — Nelson Mullins Riley & Scarborough LLP

(57) ABSTRACT

An algorithm and architecture are disclosed for performing multi-argument associative operations. The algorithm and architecture can be used to schedule operations on multiple facilities for computations or can be used in the development of a model in a modeling environment. The algorithm and architecture resulting from the algorithm use the latency of the components that are used to process the associative operations. The algorithm minimizes the number of components necessary to produce an output of multi-argument associative operations and also can minimize the number of inputs each component receives.

21 Claims, 12 Drawing Sheets

U.S. PATENT DOCUMENTS

| | | |
|---|---|---|
| 2005/0135498 A1 | 6/2005 | Yee |
| 2005/0144213 A1 | 6/2005 | Simkins et al. |
| 2005/0144214 A1 | 6/2005 | Datta et al. |
| 2005/0144215 A1 | 6/2005 | Simkins et al. |
| 2005/0144216 A1 | 6/2005 | Simkins et al. |
| 2005/0174144 A1 | 8/2005 | Veredas-Ramirez et al. |
| 2006/0015547 A1 | 1/2006 | Kuszmaul et al. |
| 2006/0090152 A1* | 4/2006 | Lin et al. .................. 716/11 |
| 2006/0101368 A1* | 5/2006 | Kesarwani et al. ............. 716/11 |
| 2007/0260663 A1 | 11/2007 | Frigo et al. |

* cited by examiner

ALGORITHM AND ARCHITECTURE FOR MULTI-ARGUMENT ASSOCIATIVE OPERATIONS THAT MINIMIZES THE NUMBER OF COMPONENTS USING A LATENCY OF THE COMPONENTS

RELATED APPLICATIONS

This application is a divisional of U.S. patent application Ser. No. 11/444,962, filed May 31, 2006, the contents of which are hereby incorporated by reference.

FIELD OF THE INVENTION

The present invention relates to an architecture that efficiently uses the latency of a component to calculate an output of multi-argument associative operations. More specifically, the present invention relates to a method and system for generating the architecture as well as the architecture itself.

BACKGROUND

Several conventional architectures exist for calculating an output of multi-argument associative operations. An associative operation is an operation that can process inputs in any order. For example, mathematical operations that are associative operations include, but are not limited to addition, subtraction and multiplication. Associative properties are maintained when performing certain combinations of operations, such as addition and subtraction, but associative properties are not maintained when performing other combinations of operations, such as addition and multiplication. The conventional architectures include components for implementing operators that perform the associative operations. An operator performs a function on two or more operands or inputs and can, for example, perform the mathematical operation of addition.

One example of a conventional architecture is a serial architecture. Using the serial architecture, only one component is necessary despite the number of inputs (N). Assuming that it takes one clock cycle to perform the operation on two operands, the number of cycles necessary to calculate the output of the multi-argument associative operations is equal to the number of inputs minus one (i.e., the number of Cycles=N−1). FIG. 1 illustrates an example of a serial architecture 100 that receives four inputs. To calculate the output 190, the serial architecture calculates a first output (not shown) using a first input 102 and a second input 104 in a first cycle. The serial architecture 100 then calculates a second output (not shown) using the first output and a third input 106 in a second cycle. Using the second output and a fourth input 108, the serial architecture calculates the output 190 in a third cycle. Thus, for a multi-argument associative operation that has four inputs, the serial architecture 100 requires three cycles to calculate the output. If the serial architecture had eight inputs, the serial architecture would require seven cycles to calculate the output. In this manner, a serial architecture calculates the output of a multi-argument associative operation in series.

Another conventional architecture is a tree or parallel architecture. For a multi-argument associative operation that has a number of inputs that is greater than two, the tree architecture uses multiple components to calculate the output of the operation. The components in the tree architecture can operate in stages such that all components in the same stage operate during the same cycle.

For a multi-argument associative operation that has N inputs, the number of cycles required to calculate the output is equal to $\log_2(N)$, assuming it takes one clock cycle per operation. FIG. 2 illustrates a tree architecture 200 for a multi-argument associative operation that has eight inputs. The tree architecture has a first stage 202, a second stage 204 and a third stage 206.

The first stage 202 includes a first component 210, a second component 220, a third component 230, and a fourth component 240. The first component 210 receives a first input 212 and a second input 214 and produces a first output 216. The second component 220 receives a third input 222 and a fourth input 224 and produces a second output 226. The third component 230 receives a fifth input 232 and a sixth input 234 and produces a third output 236. The fourth component 240 receives a seventh input 242 and an eighth input 244 and produces a fourth output 246. Each of the components 210, 220, 230 and 240 calculates each output 216, 226, 236 and 246, respectively, during a first cycle.

The second stage 204 includes a component 250 and a component 260. The component 250 receives the first output 216 and the second output 226 from components 210 and 220, respectively, and produces an fifth output 256. The component 260 receives the third output 236 and the fourth output 246 from components 230 and 240, respectively, and produces a sixth output 266. Each of the components 250 and 260 calculates each output 256 and 266 during a second cycle.

The third stage 206 includes a component 270 that receives the fifth output 256 and the sixth output 266 from the components 250 and 260, respectively, and produces an output 280 during a third cycle.

In yet another conventional architecture, the tree architecture is combined with the serial architecture to form a serial/tree architecture. The serial/tree architecture attempts to take advantage of the smaller number of cycles required by the tree architecture and the smaller number of components required by the serial architecture. FIG. 3 illustrates a serial/tree architecture 300 for a multi-argument associative operation that has eight inputs. The serial/tree architecture 300 has a first stage 302 and a second stage 304.

The first stage 302 includes a component 310 and a component 350. The component 310 receives a first input 312, a second input 314, a third input 316, and a fourth input 318 and produces a first output 320. The component 350 receives a fifth input 352, a sixth input 354, a seventh input 356, and an eighth input 358, and produces a second output 360. The components 310 and 350 each calculate a first preliminary output (not shown) using the first and second inputs 312 and 314 and the fifth and sixth inputs 352 and 354, respectively. After calculating the first preliminary output the component 310 calculates a second preliminary output (not shown) using the first preliminary output and the third input 316 during a second cycle. The component 350 also calculates a second preliminary output (not shown) using the first preliminary output and the seventh input 356 during the second cycle. On a third cycle, the components 310 and 350 each calculate an output 320 and 360, respectively. The component 310 calculates the output 320 using the second preliminary output and the fourth input 318 and the component 350 calculates the output 360 using the second preliminary output and the eighth input 358. The outputs 320 and 360 are used by the second stage of the serial/tree architecture to calculate the output 380 of the multi-argument associative operations. In this manner, the second stage 304 includes a third component 370 that receives the first output 320 and the second output 360 and produces an output 380 in a fourth cycle.

Comparing the serial/tree architecture to the tree architecture it is observed that the serial tree/architecture provides a reduction in the number of components required to calculate an output of a multi-argument associative operation, but it requires more cycles.

The conventional architectures for calculating an output of multi-argument associative operations do not efficiently use the latency of the components, while minimizing the number of components required to calculate an output. For example, the tree architecture minimizes the number of cycles necessary to calculate the output, but uses a large number of components to do it and the serial architecture minimizes the number of components, but requires the number of cycles to be one less than the number of inputs. While the serial/tree architecture provides a compromise between the tree and serial architecture, the serial/tree architecture does not fully take advantage of the latency of the components. By minimizing the number of components that are used to implement multi-argument associative operations, it is possible to reduce the area required to implement the associative operations as well as the cost of implementing the multi-argument associative operations. Further, by minimizing the number of components that are used, a reduction in the complexity of implementing the associative operations can be realized. An algorithm and architecture are therefore desired that minimizes the number of components required to calculate the output of multi-argument associative operations by using the latency of the components.

SUMMARY OF THE INVENTION

Embodiments of the present invention provide an architecture that uses the latency of a component to minimize the number of components required to calculate the output of multi-argument associative operations. The architecture determines, based on the number of inputs to the multi-argument associative operations, the number of components that are required. Embodiments of the present invention enable the implementation of a model having the architecture of the present invention in a modeling environment. Further, embodiments of the present invention allow the architecture to be implemented in a programming language or a hardware description language (HDL). In further embodiments, the architecture can be used for scheduling operations on facilities for computations such as a microprocessor and specialized hardware for computational operations in a computing system.

In one aspect, a method in a computing system is disclosed for determining an architecture for calculating an output of associative operations. The method generates a first component that has at least two inputs and is operable to produce a first output, and generates a second component that has at least three inputs, where at least one of the at least three inputs is the first output of the first component. The second component is operable to process two of the at least three inputs to produce a second output prior to receiving the first output from the first component. The second component is further operable to process the first output and the second output to produce a third output after first and second outputs are produced.

In another aspect, a computer-readable medium holding instructions for determining an architecture for calculating an output of associative operations is disclosed. The instructions perform the step of generating a first component that has at least two inputs and is operable to produce a first output. The instructions further perform the step of generating a second component that has at least three inputs, where at least one of the at least three inputs is the first output of the first component. The second component is operable to process two of the at least three inputs to produce a second output prior to receiving the first output from the first component, and is operable to process the first output and the second output to produce a third output after first and second outputs are produced.

In yet another aspect, a computing system is disclosed for determining an architecture for calculating an output of associative operations. The computing system includes a modeling environment and an architecture generator. The architecture generator is used by the modeling environment to generate a first component and a second component. The first component comprising at least two inputs and is operable to produce a first output. The second component comprising at least three inputs, where at least one of the at least three inputs is the first output of the first component. The second component is operable to process two of the at least three inputs to produce a second output prior to receiving the first output from the first component, and is operable to process the first output and the second output to produce a third output after first and second outputs are produced.

In still another aspect, a computing system for calculating an output of associative operations is disclosed. The computing system provides a means for generating a first component comprising at least two inputs and is operable to produce a first output. The computer system further provides a means for generating a second component comprising at least three inputs, where at least one of the at least three inputs is the first output of the first component. The second component is operable to process two of the at least three inputs to produce a second output prior to receiving the first output from the first component, and is operable to process the first output and the second output to produce a third output after first and second outputs are produced.

In another aspect, a method for scheduling operations in a computing system with a plurality of processors is disclosed. The computing system can be a single computing device or the computing system could be a network of computing devices. The method includes the step of scheduling a plurality of facilities for computations to perform associative operations, where the plurality of facilities for computations includes a first facility for computation and a second facility for computation. The first facility for computation receiving at least two inputs of the associative operations and is operable to produce a first output. The second facility for computation receiving at least three inputs where one of the at least three inputs is the first output of the first facility for computation. The second facility for computations is operable to process two of the at least three inputs to produce a second output prior to receiving the first output from the first facility for computation, and is operable to process the first output and the second output to produce a third output after first and second outputs are produced.

In an additional aspect, a medium for holding instructions executable using a computing system is disclosed. The instructions perform the step of scheduling a plurality of facilities for computations to perform associative operations, where the plurality of facilities for computations includes a first facility for computation and a second facility for computation. The first facility for computation receiving at least two inputs of the associative operations and is operable to produce a first output. The second facility for computation receiving at least three inputs where one of the at least three inputs is the first output of the first facility for computation. The second facility for computations is operable to process two of the at least three inputs to produce a second output prior to receiving the first output from the first facility for computation, and is operable to process the first output and the second output to produce a third output after first and second outputs are produced.

In a further aspect, a computing system is disclosed. The computing system includes facilities for computations and a scheduler. The scheduler schedules the processing of associative operations. The facilities for computations include a first facility for computation and a second facility for computation. The first facility for computation receiving at least two inputs of the associative operations and is operable to produce a first output. The second facility for computation receiving at least three inputs where one of the at least three inputs is the first output of the first facility for computation. The second facility for computations is operable to process two of the at least three inputs to produce a second output prior to receiving the first output from the first facility for computation, the second facility for computation is operable to process the first output and the second output to produce a third output after first and second outputs are produced.

In another aspect, a computing system with facilities for computations for calculating an output of associative operations is disclosed. The computing system includes a means for scheduling the processing of the associative operations. The facilities for computations include a first facility for computation and a second facility for computation. The first facility for computation receiving at least two inputs of the associative operations and is operable to produce a first output. The second facility for computation receiving at least three inputs where one of the at least three inputs is the first output of the first facility for computation. The second facility for computations is operable to process two of the at least three inputs to produce a second output prior to receiving the first output from the first facility for computation, and is operable to process the first output and the second output to produce a third output after first and second outputs are produced.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

The illustrative embodiment of the present invention provides an architecture that uses the latency of a component to minimize the number of components required to calculate an output of multi-argument associative operations as well as an algorithm that is used to generate the architecture. The latency of a component can be affected by the computational complexities of a component such as a bit width of the inputs to the computer and how many bits a component can use during each computation. The algorithm determines, based on the number of operands or inputs to the multi-argument associative operations, the number of components that are required. The components implement operators for performing the associative operations. In the case where there is a mixture of associative operations such as, for example, addition and multiplication, the illustrative embodiment can break the operations into subclasses of operations, where each subclass has associative properties and each of the subclasses can be processed in order. The algorithm and architecture of the illustrative embodiment can be used to implement a model in a modeling environment. In addition, the illustrative embodiment allows the architecture to be implemented in a programming language or a hardware description language. The hardware description language can represent a hardware design that can be implemented in a hardware device. In further embodiments, the algorithm can be used for scheduling operations on facilities for computations such as a processor or specialized hardware for computational operations in a computing system. The computing system can be a single computing device or networked computing devices. The operations on a network can be performed on any node in the network that has computational facilities such as, for example, a smart sensor or printer device.

The algorithm of the illustrative embodiment is operative to develop a hierarchical architecture such that each subsequent component in the hierarchy has more inputs than a previous component in the hierarchy. To achieve this, the algorithm decomposes the number of inputs for associative operations into components that can be represented by a vector $V=[A_k A_{k-1} \ldots A_2 A_1]$. The total number of elements in the vector represents the total number of components required to calculate the output to the multi-argument associative operations. The component $A_1$ represents the component at the bottom of the hierarchy and the component $A_k$ represents the component at the top of the hierarchy. Each value for 'A' represents the number of inputs for each component. Each subsequent component in the hierarchy has more inputs than the previous component. For example, in the vector, V, the value of A2 is greater than the value of A1.

Figure 1:
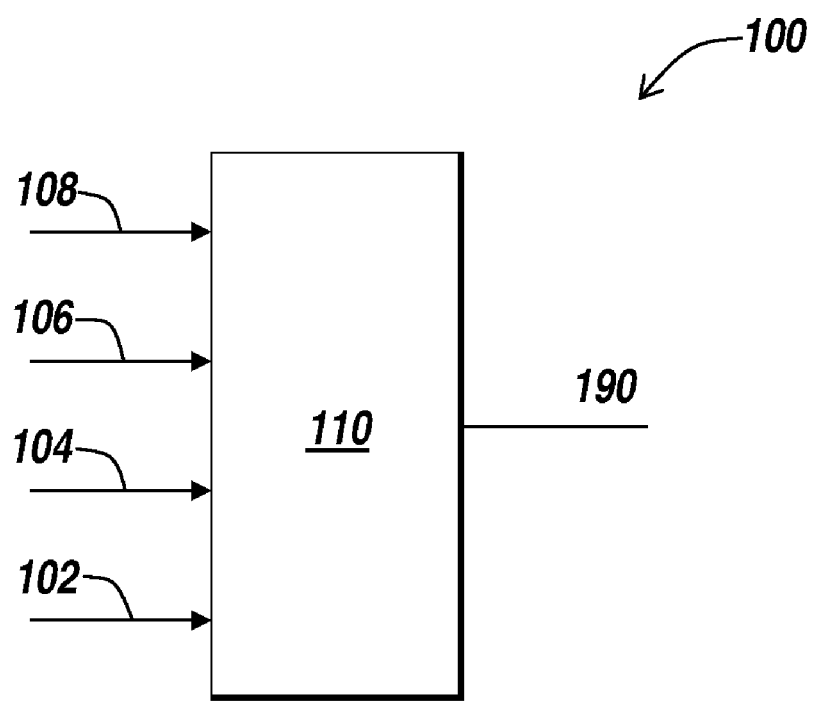
FIG. 1 illustrates a conventional serial architecture that can be implemented for calculating an output for multi-argument associative operations.
Figure 2:
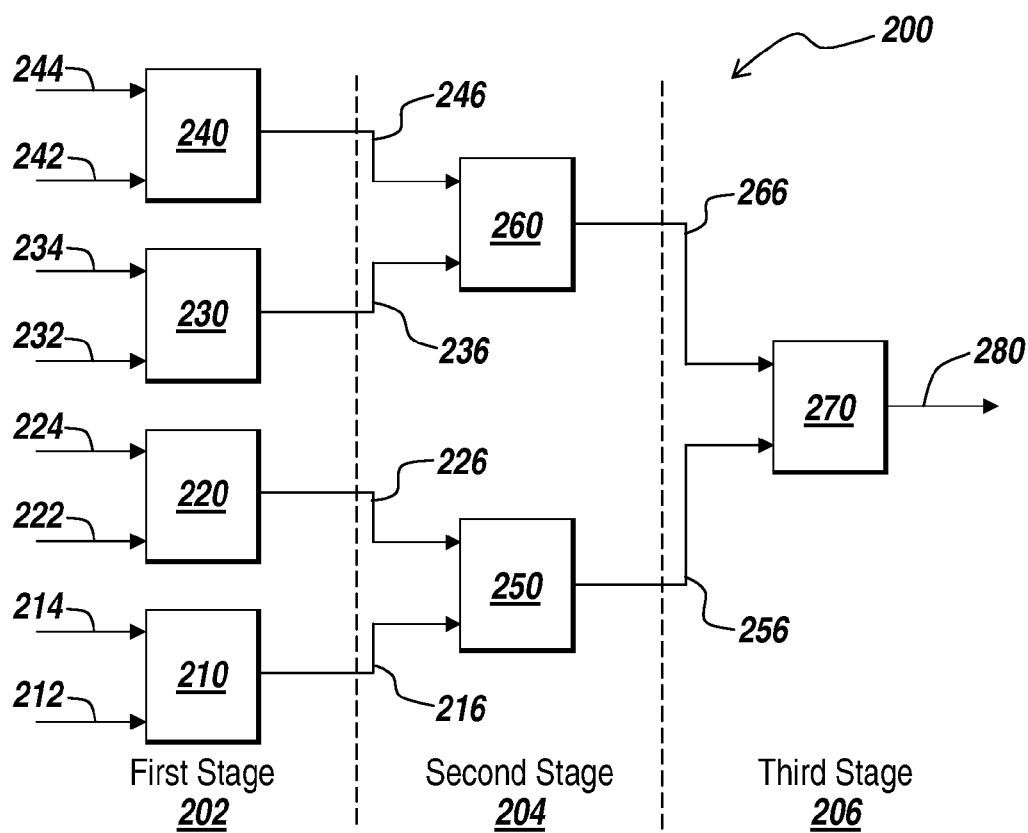
FIG. 2 illustrates a conventional tree architecture that can be implemented for calculating an output for multi-argument associative operations.
Figure 3:
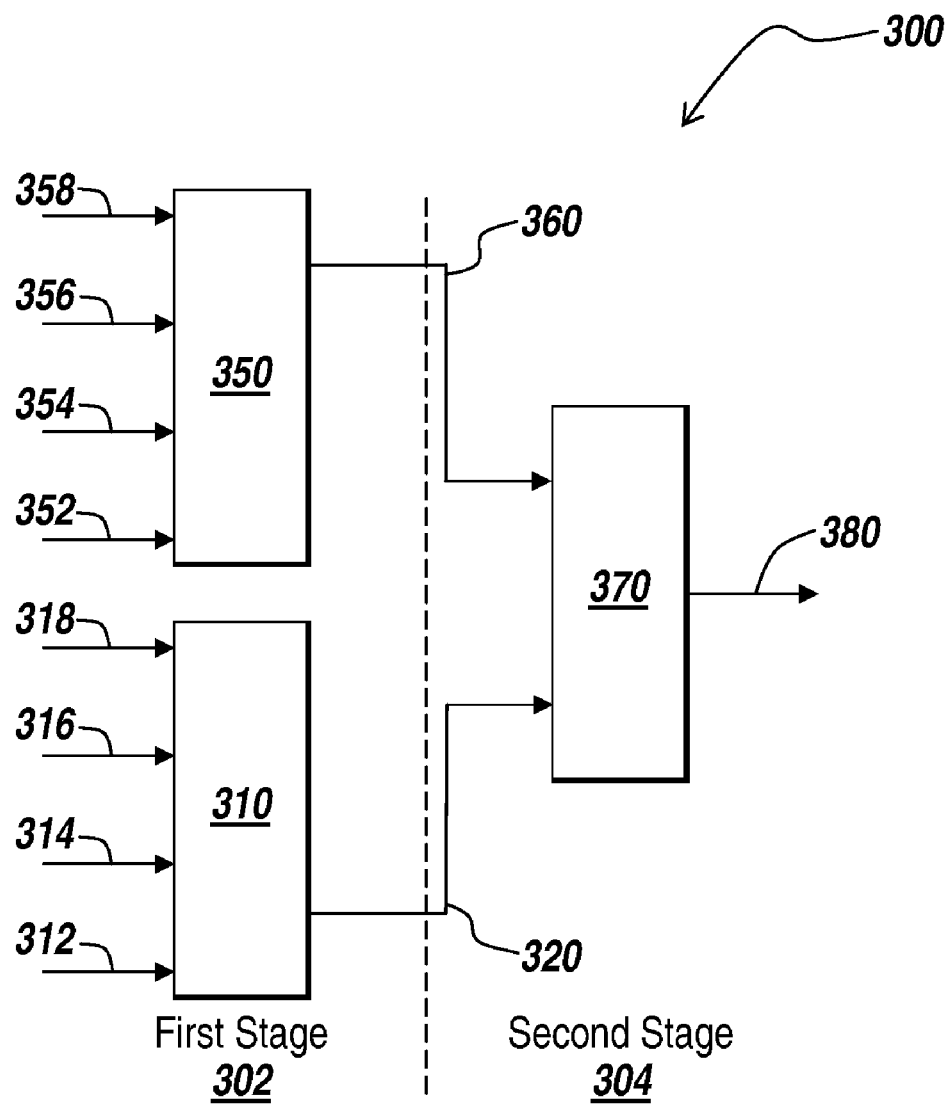
FIG. 3 illustrates a conventional serial/tree architecture that can be implemented for calculating an output for multi-argument associative operations.
Figure 4:
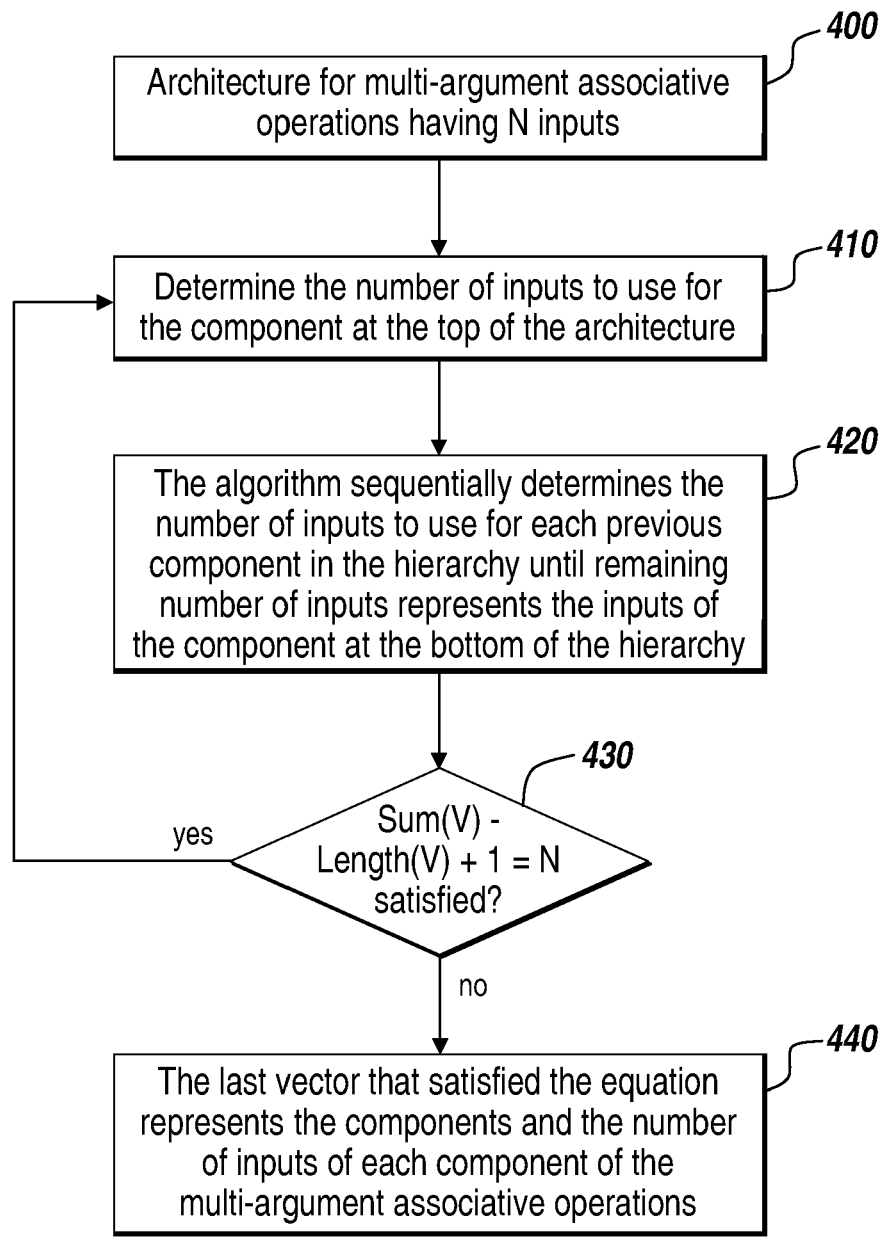
FIG. 4 is a flow diagram that illustrates the steps performed by the algorithm of the illustrative embodiment to generate the architecture of the illustrative embodiment.

FIG. 4 depicts the steps performed by the algorithm to generate the architecture in accordance with the illustrative embodiment. The architecture can be used for multi-argument associative operations having N inputs (step 400). The algorithm begins at the top of the hierarchy with component $A_k$ of the vector, V, and determines the number of inputs to use for the component $A_k$ (step 410). The component $A_k$ can be represented by one plus the result of a value 'm' subtracted from the total number of inputs, N (1+N−m). The value of 'm' represents the number of remaining inputs that can be used by the previous component in the vector, $A_{k-1}$. The algorithm sequentially determines the number of inputs to use for each previous component in the hierarchy (step 420). The component $A_{k-1}$ can be represented by one plus the result of a value 'p' subtracted from the remaining number of inputs (1+N−p). The value 'p' represents the remaining number of inputs that can be used by the next previous component in the vector, V. For each of the iterations, the values of 'm' and 'p' are independently maximized by the algorithm, but the value of 'p' can never be greater than the value of 'm', since the number of remaining inputs decreases for each previous component in the hierarchy. Each component in the hierarchy between the top and bottom of the hierarchy can be represented in a similar way as the component $A_{k-1}$, such that each component uses the remaining number of inputs from the subsequent component and each value that is subtracted from the remaining inputs from the subsequent component initially equals one for each of the iterations. For example, the component $A_{k-2}$ uses the remaining number of inputs, represented by the value 'p', from the component $A_{k-1}$. When the remaining number of inputs is less than four, the remaining number of inputs represents the inputs of the component at the bottom of the hierarchy, $A_1$ (step 420).

The algorithm performs an iterative process of reducing the number of inputs for each component (i.e., maximizing the values of 'm' and 'p') until the equation, EQ1, is not satisfied (step 430).

$$\text{Sum}(V)-\text{Length}(V)+1=N; \qquad \text{EQ1:}$$

When the equation EQ1 is not satisfied (step 430), the last vector that satisfied the equation represents the components and the number of inputs of each component of the multi-argument associative operations (step 440).

For example, for multi-argument associative operations that have eight inputs the last vector, V, that satisfies the equation EQ1 is V=[5 3 2]. Here the length of the vector is three and the sum of the vector is 10. For this vector, it is observed that $A_k$=5, $A_{k-1}$=3 and $A_1$=2; the value 'm' equals 4 (m=4); and the value 'p' equals 4 (p=4). The algorithm results in three components and a total of ten inputs. The two extra inputs are inputs to the outputs from the previous components in the hierarchy.

Figure 5:
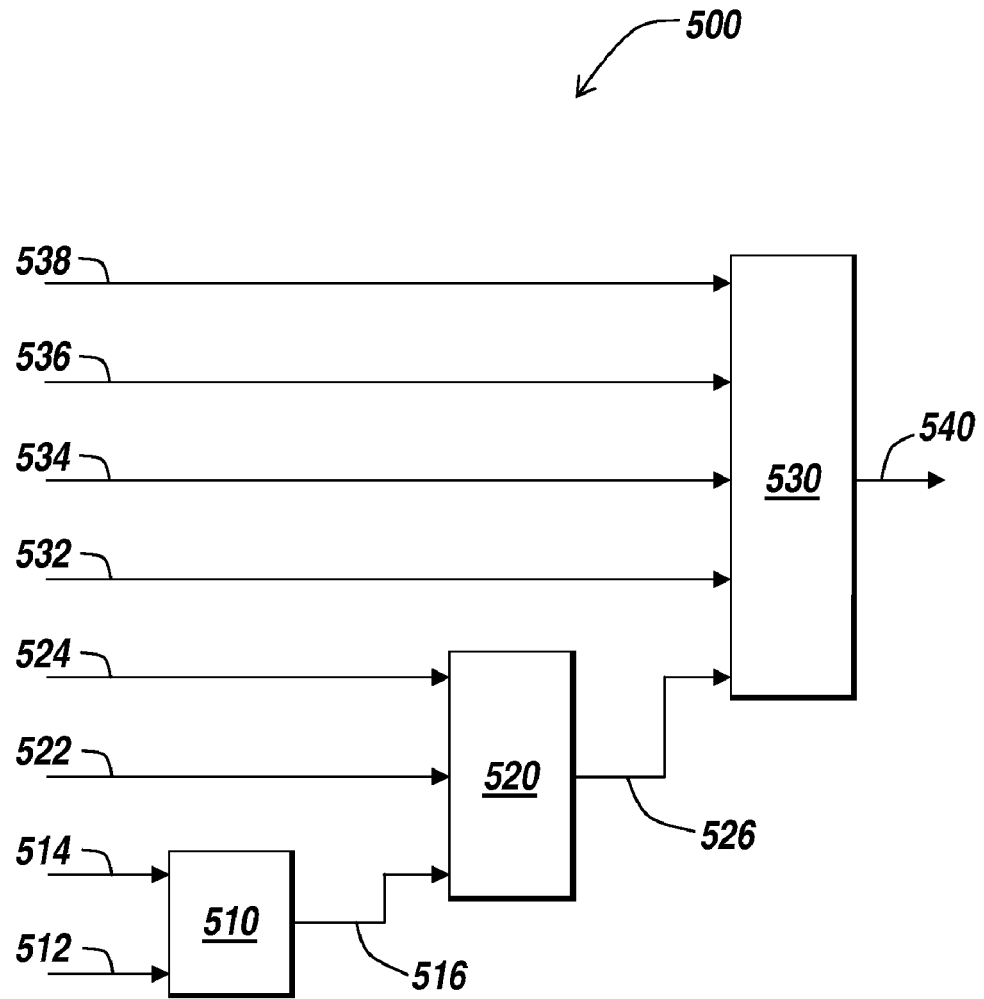
FIG. 5 illustrates an example of an architecture produced by an algorithm provided by the illustrative embodiment.
Figure 6:
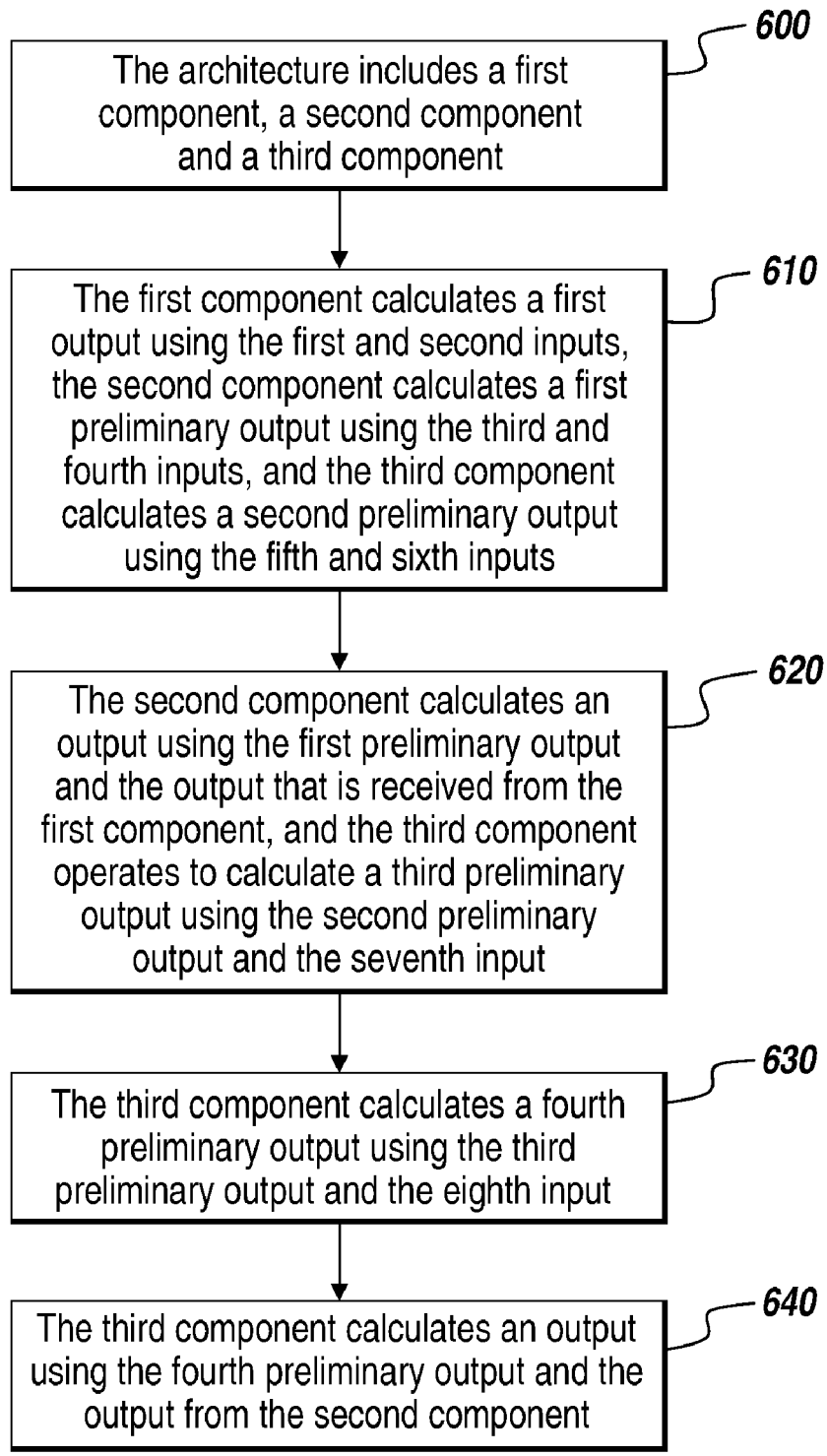
FIG. 6 is a flow diagram that illustrates the steps for implementing the architecture of FIG. 5.

FIG. 5 illustrates the architecture produced by the algorithm for a multi-argument expression of associative operations that has eight inputs. FIG. 6 depicts a flow diagram for implementing the architecture of FIG. 5. The architecture 500 includes a component 510, a component 520 and a component 530 (step 600). The component 510 receives a first input 512 and a second input 514, the component 520 receives a third input 522 and a fourth input 524, and the component 530 receives a fifth input 532, a sixth input 534, a seventh input 536, and a eighth input 538. The architecture 500 includes both serial and parallel computation and uses the latency of the components to minimize the number of components.

The latency of a component can be affected by the computational complexity. For example, the components 510, 520 and 530 can be a digital device that is capable of processing a certain number of bits per computation. If the digital device can process 8 bits per computation and receives an input that has a bit width of 16 bits, the component needs to perform two computations to get a result. The increase in the number of computations can be reflected in the latency of the component. By determining the computational complexities of each component, the algorithm can use the computational complexity to generate an architecture that fully utilizes the latencies of each component. The latency of each component can be obtained using experiments and may vary. The latency can be represented by, for example, the worst case value, or a stochastic/uncertainty representation can be employed.

Initially, the component 510 calculates an output 516 using the inputs 512 and 514, the component 520 calculates a first preliminary output (not shown) using the inputs 522 and 524, and the component 530 calculates a second preliminary output (not shown) using the inputs 532 and 534 (step 610). Thus, each component 510, 520 and 530 is initially operative. In a synchronous system, assuming each operation takes one clock cycle, the initial period can be referred to as a first clock cycle.

After the calculation of the output 516 is complete, the component 520 calculates an output 526 using the first preliminary output and the output 516 that is received from the component 510 (step 620). At this time, the component 530 also operates to calculate a third preliminary output (not shown) using the second preliminary output and the seventh input 536 (step 620). It is therefore observed that the output 516 of the component 510 is received by the component 520 when the component 520 is ready to process the output 516. In a synchronous system, again assuming each operation takes one clock cycle, this period can be a second clock cycle.

Subsequently, the component 530 calculates a fourth preliminary output (not shown) using the third preliminary output and the input 538 (step 630). At this time, the output from the component 520 is received by the component 530.

Finally, the component 530 calculates an output 540 using the fourth preliminary output and the output 526 that is received from the component 520. Thus, the output 540 of the eight input associative operation is calculated in four cycles using three components.

Each preliminary output produced by the components 510, 520 and 530 can be output from the components 510, 520 and 530. For example, a user may wish to verify each preliminary output to verify the operation of the components 510, 520 and 530. Further, it will be recognized by one skilled in the art that the components 510, 520 and 530 can produce multiple outputs.

It is observed that the architecture 500 uses the latency of each component to calculate an output as well as the number of inputs of the associative operations to minimize the number of components while not incurring a substantial penalty in the number of cycles required to calculate the output of the associative operations. As a result of the architecture generated by the algorithm, the output of a previous component in the hierarchy is calculated prior to the output of the previous component being required for a calculation.

While the above discussion assumes that it takes one clock cycle for each operation to calculate a result, it will be recognized by one skilled in the art that the time required to calculate a result can vary. For example, it may take multiple clock cycles or a fraction of a clock cycle to calculate the result. Further, in accordance with the illustrative embodiment, each component can require a different amount of time to calculate a result as long as the latency of each component is know when the algorithm generates the architecture. That is, the algorithm can adjust the architecture based on the latencies of each component. The latency of each component can be obtained using experiments and may vary. The latency can be represented by, for example, the worst case value, or a stochastic/uncertainty representation can be employed.

Each component can have a different clock rate and the clock rates can be adjusted so that variable latencies in time are obtained. For example, a component can be adjusted to run at a lower clock rate to conserve power. In this manner, semi-synchronous operations can be achieved such that the components can run at different clock rates. This change of clock rate may occur for periods of time.

In addition, for asynchronous operation a data flow approach that may rely on a handshake communication protocol can be used. As such, for asynchronous operation a clock mechanism is not required. For example, with reference to FIG. 5, the component 510 can communicate with the component 520 indicating to the component 520 that an output is available from the component 510. Upon receiving the communication from the component 510, the component 520 can communicate with the component 510 indicating that the component 520 is ready for the output from the component 510. While the above provides an example of a possible handshake protocol one skilled in the art will recognize that other variations of communication protocols can be implemented in accordance with the illustrative embodiment.

The algorithm can generate an architecture for multi-argument associative operations that has any number of inputs. For example, if the multi-argument associative operations has thirty-two inputs the algorithm generates the vector, V=[9 8 7 5 4 3 2]. Another example of a vector that can be generated by the algorithm is for a multi-argument expression of associative operation that has thirty inputs is V=[9 7 6 5 4 3 2].

In addition, a user can supply additional constraints when determining the architecture. For example, the user can specify that each of the components has a minimum or maximum number of inputs and the algorithm can be used to account for these additional constraints to determine an optimal architecture. One skilled in the art will recognize that other restrictions can be applied within the scope of the present invention, such as, for example, the availability of a fixed number of components with a given set of inputs and components with a given latency.

A comparison of the tree architecture, serial/tree architecture and the architecture of the illustrative embodiment is provided in Tables 1 and 2 and is based on the number of inputs of the associative operations. As illustrated in Table 1, the number of components required to calculate the output of multi-argument associative operation is reduced using the architecture of the illustrative embodiment ("new architecture") as compared to the tree architectures. Further, the new architecture uses at least as few components as the serial/tree architecture. As illustrated in Table 2, the total number of cycles required to calculate the output of multi-argument associative operations does not incur a substantial penalty using the new architecture and in many cases is equal to the number of cycles required when using the serial/tree architecture.

TABLE 1

| Number of Inputs (N) | Number of Components | | |
|---|---|---|---|
| | Tree | New Architecture | Serial.-Tree |
| N = 4 | 3 | 2 | 3 |
| N = 8 | 7 | 3 | 3 |
| N = 16 | 15 | 5 | 7 |
| N = 17 | 16 | 5 | 8 |
| N = 18 | 17 | 5 | 9 |
| N = 19 | 18 | 5 | 10 |
| N = 20 | 19 | 5 | 9 |
| N = 32 | 31 | 7 | 7 |
| N = 64 | 63 | 10 | 15 |

TABLE 2

| Number of Inputs (N) | Number of cycles | | |
|---|---|---|---|
| | Tree | New Architecture | Serial.-Tree |
| N = 4 | 2 | 3 | 2 |
| N = 8 | 3 | 5 | 5 |
| N = 16 | 4 | 6 | 6 |
| N = 17 | 5 | 7 | 7 |
| N = 18 | 5 | 7 | 7 |
| N = 19 | 5 | 7 | 7 |
| N = 20 | 5 | 7 | 7 |
| N = 32 | 5 | 9 | 10 |
| N = 64 | 6 | 12 | 11 |

Figure 7:
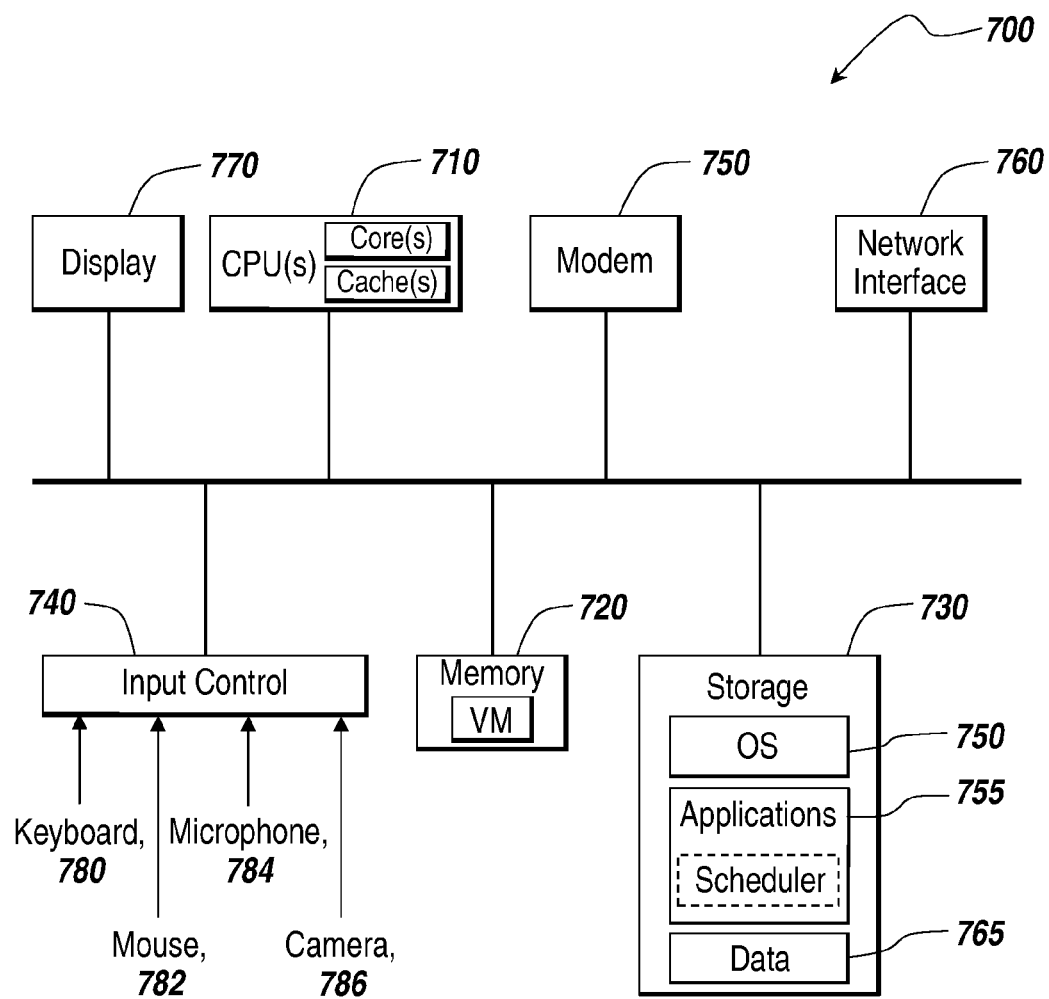
FIG. 7 depicts an example of a computing device suitable for practicing the illustrative embodiment of the present invention

FIG. 7 is an exemplary computing device 700 suitable for practicing the illustrative embodiment of the present invention. One of ordinary skill in the art will appreciate that the computing device 700 is intended to be illustrative and not limiting of the present invention. The computing device 700 may take many forms, including but not limited to a personal computer, a workstation, server, network computer, quantum computer, optical computer, bio-computer, Internet appliance, mobile device, a pager, a tablet computer, a smart sensor and the like. The computing device 700 can be capable of communication on a network and has sufficient processor power and memory capacity to perform the operations described herein.

The computing device 700 can be an electronic device and/or an optical device and can include a Central Processing Unit (CPU) 710, memory 720, storage 730, a input control 740, a modem 750, a network interface 760, a display 770, etc. The storage 730 usually contains software for applications and device drivers. The storage 730 includes, in particular, code 750 for the operating system (OS) of the computing device 700, and code 755 for applications running on the operating system, such as a modeling environment or a scheduler, which are discussed in more detail herein. Those of ordinary skill in the art will appreciate that the applications can be stored in the memory 720, CPU cache or other computer readable memory as well, much like the data and even the OS, or they can be stored on the network described below with reference to FIG. 8. The memory 720 can temporarily store instructions and data and provide them to the CPU 710 so that the CPU 710 operates the computing device 700 to run the applications.

Optionally, the computing device 700 may include multiple CPUs for executing software loaded in the memory 720, and other programs for controlling system hardware. Each of the CPUs can be a single or multiple core processor. The code loaded in the memory 720 may run in a virtualized environment, such as in a Virtual Machine (VM). Multiple VMs may be resident on a single processor. In addition, the computing device 700 may use multiple threads for performing operations. Also, part of the application could be run in hardware, for example, by configuring a field programmable gate array (FPGA) or creating an application specific integrated circuit (ASIC). Further, part of the applications may be run on analog electronic devices or other resources may be used to run part of the application, such as graphics processing units (GPUs).

Network interface 760 may be used to interface computing device 700 to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM).

The input control 740 may interface with a keyboard 780, a mouse 782, microphone 784, camera 786 and other input devices. The computing device 700 may receive through the input control 740 input data necessary for generating the architecture of the illustrative embodiment of the present invention, such as the selection of the attributes and operations of a model in a modeling environment. The computing device 700 may also receive through the input control 740 input data necessary for controlling the execution of a model in the modeling environment. The computing device 700 may display in the display 770 user interfaces for the users to create or edit the block diagram.

Figure 8:
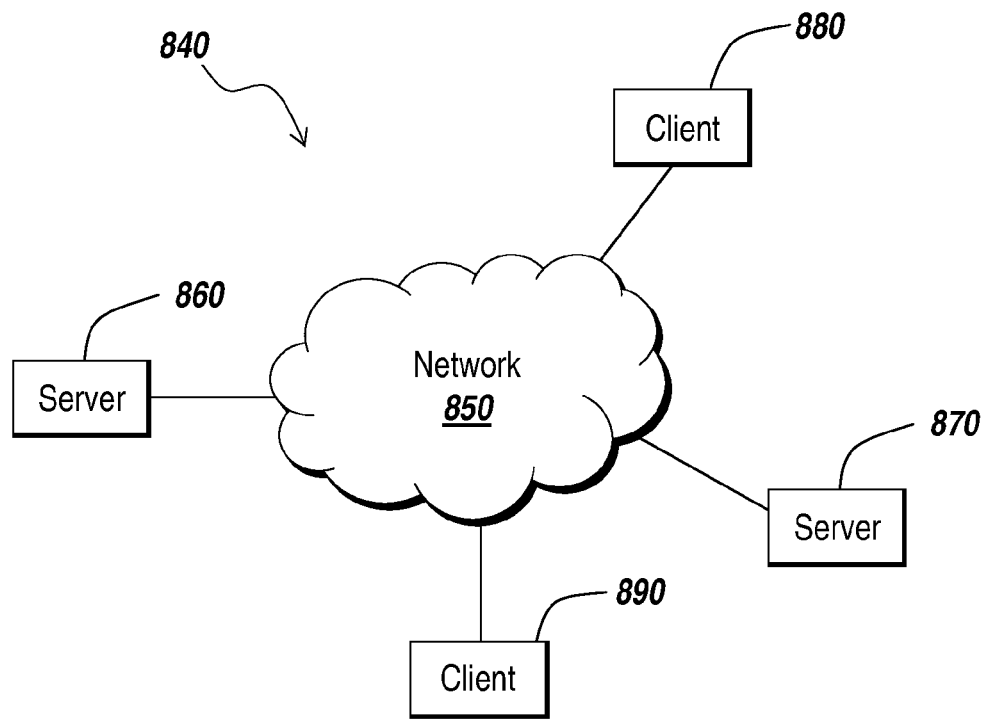
FIG. 8 depicts an example of a distributed system suitable for the distributed implementation of the illustrative embodiment.

FIG. 8 is an exemplary network environment 840 suitable for a distributed implementation of the illustrative embodiment. The network environment 840 may include one or more servers 860 and 870 coupled to clients 880 and 890 via a communication network 850. The network interface 760 and the modem 750 of the computing device 700 enable the servers 860 and 870 to communicate with the clients 880 and 890 through the communication network 850. The communication network 850 may include Internet, intranet, LAN (Local Area Network), WAN (Wide Area Network), MAN (Metropolitan Area Network), etc. In addition the network may use middleware, such as CORBA and DCOM, optionally with extensions to facilitate real-time operation, to allow a computer on the network to communicate directly with a computing device or a device located that is connected to the network. The communication facilities can support the distributed implementations of the present invention.

In one aspect, the illustrative embodiment of the present invention provides a scheduler that uses the architecture to schedule operations on multiple facilities for computations such as multiple processors, a multi-core processor or specialized hardware for computational operations such as a adder, multiplier, or fast Fourier transform (FFT). The facilities for computations can be on the computing device 700 or on multiple computing devices that are connected in the network environment 840. In the case where the facilities for computations are distributed on a network, the communication between the facilities for computations could be a client/server model, a publish/subscribe protocol, shared data based, or any other network related communication protocol.

Each of the components 510, 520 and 530 of FIG. 5 can, for example, represent facilities for computations that perform operations on the inputs. The flow diagram of FIG. 6 illustrates the steps the facilities for computations in the architecture 500 take to calculate the output of the multi-argument associative operations. The algorithm can schedule the facility for computations 510 such that the facility for computations 510 is used to calculate the output 516 based on the first input 512 and the second input 514; the facility for computations 520 is used to calculate the output based on the third input 522, the fourth input 524 and the output 516 from the component 510; and the facility for computations 530 to calculate the output 540 based on the fifth input 532, the sixth input 534, the seventh input 536, the eighth input 538 and the output 526 from the component 520.

The operation performed by facilities for computations 510, 520 and 530 can be, for example, addition such that each of the facilities for computations add two inputs at a time. Each of the facilities for computations 510, 520 and 530 can operate in parallel such that the component 510 is operable to calculate the sum of the first and second inputs, 512 and 514; the facility for computations 520 is operable to calculate the sum of the third and fourth inputs, 522 and 524; and the facility for computations 530 is operable to calculate the sum of the seventh and eighth inputs, 536 and 538 during the same period. Since the facilities for computations 520 and 530 receive more than two inputs, the components 520 and 530 require more time to calculate the outputs 526 and 540, respectively.

The total latency required to calculate the outputs 516, 526 and 540 of each of the facilities for computations 510, 520 and 530, respectively, increases from the bottom of the hierarchy to the top of the hierarchy. For example, if each operation performed by the facilities for computations 510, 520 and 530 takes one clock cycle, the total latency of the facility for computations 510 to complete its operation is one cycle, the total latency of the facility for computations 520 to complete its operations is two cycles, and the total latency of the facility for computations 530 to complete its operations is four cycles. The algorithm and architecture of the illustrative embodiment, therefore, allows the associative operations to be scheduled so that the facilities for computations are performing operations of the associative operations while waiting for the output of a previous facility for computations in the hierarchy. When the output of the previous facility for computations becomes available, the output is received by the subsequent facility for computations in the hierarchy at or prior to the time the output of the previous facility for computations is required to calculate an output of the subsequent facility for computations.

Each facility of computations can represent a core in a multi-core processor, where threads are assigned to portions of the operations and each thread can be processed in one core in the multi-core processor. In this manner, the cores of the multi-core processors can process the threads in parallel. One skilled in the art will recognize that other implementations of multi-core processors and multithreading can be used in accordance with the illustrative embodiment. Further, one of skill in the art will recognize that other implementations of multi-core processors exist that do not utilize threads or that utilize threads in a different manner.

In one aspect of the present invention, if during operation a facility for computations is determined to be slower than the other facilities for computations that are being used, the facilities for computations can be dynamically reconfigured to account for the slower facility for computations. In one example, if during operation the facility for computations 510 is determined to require more time than the facility for computations 520 to perform an operation such that the facility for computations 520 is ready for the output of the facility for computations 510, but the facility for computations 510 has not completed its operation, the facility for computations 510 and the facility for computations 520 can switch places in the hierarchy. In another example, if it is determined that the facility for computations 530 requires less time than the facility for computations 520 to perform an operation such that the facility for computations 530 is ready for the output of the facility for computations 520, but the facility for computations 510 has not completed its operation, the facility for computations 530 and the facility for computations 520 can switch places in the hierarchy.

The algorithm and architecture can also account for characteristics such as the type of associative operation that is being processed. For example, the algorithm can group like associative operations into a subclass, such that if the multi-argument associative operations were composed of addition and multiplication, the algorithm can develop an architecture that groups the operations for addition into one subclass and the operations for multiplication into another subclass. Further, the algorithm and architecture can be used when both associative and non-associative operations are present to process the associative operations as a subclass and to preserve the structure of the portions of operations that are not associative.

Each input to the facility for computations 510, 520 and 530 can have a specified bus width. For example, the bus width of each input can be, but is not limited to 1, 2, 4, 8, 16 and 32-bits in width.

Figure 9:
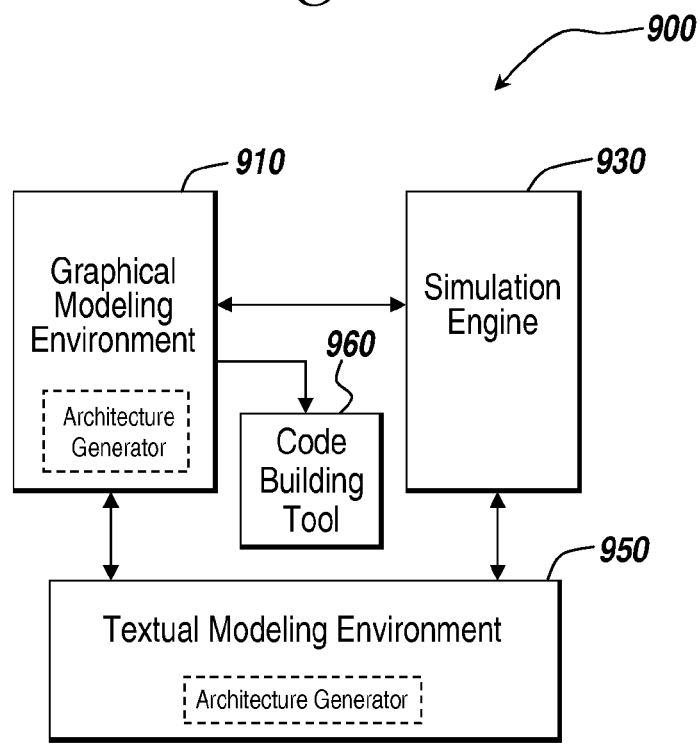
FIG. 9 depicts a high-level block diagram of an example of a modeling environment that may be used for implementing the illustrative embodiment of the present invention.

In one aspect of the invention, the algorithm and architecture of the illustrative embodiment of the present invention can be implemented in a modeling environment. FIG. 9 is a high-level block diagram of a modeling environment 900 for modeling, simulating, and analyzing dynamic systems. The modeling environment 900 can include a graphical modeling environment 910, a simulation engine 930, and a textual modeling environment 950. The modeling environment can also include an architecture generator that uses the algorithm of the illustrative embodiment to generate an architecture. The architecture generator can be independent of the graphical modeling environment 910 and the textual modeling environment 950 or can be included in the graphical modeling environment 910 and/or the textual modeling environment 950. The simulation engine 930 can communicate with the graphical modeling environment 910 and the textual modeling environment 950. The graphical modeling environment 910 can have a textual interface to allow textual interaction with the graphical model, for example by means of a command line interface and model manipulation operations such as position and deleting entities in the graphical model as well as performing other operations on the model such as querying signal values. The simulation engine 930 receives a graphical model, textual model or a model that includes both graphical and textual entities where the model is generated using the graphical modeling environment 910, the textual modeling environment 950 or a combination of the graphical modeling environment 910 and the textual modeling environment 950. Some examples of a graphical modeling environment are Simulink® and Stateflow® from The MathWorks, Inc. of Natick, Mass. An example of a textual modeling environment can be MATLAB® from The MathWorks, Inc. of Natick, Mass. A model can contain elements from Simulink®, Stateflow® and/or MATLAB®.

MATLAB® provides an intuitive language and a technical computing environment that enables the development of code. The MATLAB® environment integrates mathematical computing, visualization, and a technical language. MATLAB® provides core mathematics and advanced graphical tools for data analysis, visualization, and algorithm and application development. MATLAB® further provides a range of computing tasks in engineering and science, from data acquisition and analysis to application development. Built-in interfaces of MATLAB® enable users to access and import data from instruments, files, and external databases and programs. In addition, MATLAB® enables the users to integrate external routines written in C, C++, FORTRAN, and Java with the MATLAB® applications.

Simulink® is a graphical modeling environment that allows users to implement graphical models such as block diagram models that can represent dynamic systems. Simulink® includes blocks that can be used in block diagram models of dynamic systems to implement functions commonly used in modeling of dynamic systems. These blocks include, but are not limited to continuous and discrete dynamics blocks, such as integration and unit delay; algorithmic blocks, such as sum, product, and lookup tables; and structural blocks, such as multiplexers, switches, and signal and bus selectors. A user can alter these predefined blocks or create customized blocks. Simulink® may be used, for example, to model systems for aerospace, communications, signal processing, mechanical systems and electrical systems as well as other systems. A user may also implement user specified blocks that contain programming language statements or instructions in the technical computing language of MATLAB® as well as state diagrams developed in Stateflow®.

Simulink® can implement data elements of a graphical model to have inherited data types (such as double, single, and arbitrary fixed point representations), inherited complexity (whether a datum has a real and imaginary part), and inherited sample times. These inherited characteristics can be automatically determined by propagation of specified characteristics or aspects of the model configuration such as the integration step size. Other inference mechanisms to determine data types can be employed instead of propagation.

Further, Simulink® can provide fixed point data types that may be automatically determined based on, for example, the range values that a variable assumes during one or more executions of a graphical model.

In addition, graphical models may be executed by numerical integration or repeated execution of a step function in case of discrete models. Values computed during execution can be read infinitely many times. In other words, a value may not be 'consumed' when it is used in further computations. Instead, it can remain present till a new value is computed. Before execution, optimizations such as constant propagation (which replaces variables that are inferred to be constant during the execution by the constant value) and buffer reuse (which, for example, uses the same memory location to store an input and output of a block in a block diagram model) can be employed.

Variables in the graphical models may be of multiple dimensions and can either be represented in a vectorized form or as a bus. In vectorized form, an array or matrix of values can be used whereas in bus form a set of labeled variables can be used. Such buses can be hierarchical with one labeled variable representing a bus. Buses can be virtual and nonvirtual.

A graphical model implemented in Simulink® can include variables of a specific data type, called a frame, as used, for example, in signal processing applications. Frames are multi-dimensional data, often implemented in matrix form, and can be dynamically created and dissolved in a model. Special facilities to efficiently handle frames, such as, for example, efficient memory layout, can be provided.

A graphical model can include references to functionality to be included. These references can be to compiled functionality, represented as, for example, a shared library in binary form, but may also be references to model fragments or complete models. Model library facilities can provide containers for multiple elements of referenced functionality. References to elements can utilize a standardized API such as the S-Function interface of Simulink®. This interface supports references to C code as well as MATLAB M code.

Simulink® enables a graphical model to consist of mixed continuous-time and discrete behaviors. Discontinuities in continuous-time variables may occur and the point in time at which such a discontinuity occurs can be located with a tolerance in either time or value.

Numerical integration schemes can be employed in Simulink® to compute the continuous-time behavior with absolute and relative tolerances. These integration schemes can be of an implicit or explicit nature and can employ multiple computation steps to obtain a new value of the behavior in time. The time step made by the integration scheme can be variable from time step to time step. A solver generates behavior of a graphical model and can be based on a numerical integration scheme. The solver that is employed can be automatically selected based on the elements in the graphical model. For example, if no continuous-time elements are present a discrete solver may be automatically chosen.

The model may be executed in a single-tasking or in multi-tasking mode. In multi-tasking mode, facilities to ensure integrity of data that is shared between tasks can be automatically included in the model or an intermediate representation of the model. If a schedule for execution of the model elements can be statically determined, a rate-monotonic schedule can be automatically generated.

Code can be generated from the graphical model. The graphical model may include directives as to how the code should be generated. For example, elements in the graphical model can be directed to have a corresponding function to be generated in the code with an argument list and name as directed. This function may be reused by other graphical model elements with the same functionality. Further, optimization such as expression folding, loop unrolling, and function inlining can be applied to the generated code. The generated code can be that of a programming language such as C and C++ but can also be that of a hardware description language such as Verilog and VHDL.

Conversely, code can be read by the graphical modeling environment to create corresponding elements in a graphical model. For example, an include file that contains a struct definition can be read and a corresponding bus definition created in the graphical model or memory locations of variables in the code may be determined and a corresponding location or reference to it can be provided in the graphical model.

Simulink® provides facilities for linearization and trimming of graphical models. These linearizations can be performed based on arbitrary input and output variables and around arbitrary operating points. Further, the linearizations can be performed during execution of the model.

Coverage analyses can be performed on the graphical model to determine which model elements have been evaluated during one or a set of executions. These coverage analyses can be of different type such as, for example, condition coverage, decision coverage, and modified condition/decision coverage as defined by DO178B issued by the Federal Aviation Administration (FAA). Coverage analyses may also include minimum and maximum values of variables in a graphical model. The results of the coverage analyses can be visualized in the graphical model, for example by showing completely covered elements green and not covered elements in red.

Debugging and profiling of the graphical model can be facilitated by means of a textual interface, for example, one that is command line based, and by means of a graphical interface. This debugging facility may provide a list of methods as they are called during execution of the model and breakpoints can be set to halt execution at a desired point in the execution sequence. The breakpoints can be conditional so they are only activated based on the status and value of variables in the graphical or the status of system variables. Profiling information such as the percentage of time spent evaluating certain model elements can be provided.

The graphical modeling environment can facilitate associating requirements with model elements. These requirements may be stored in third party tools such as Microsoft Word® from Microsoft, Inc. of Redmond Wash. and DOORS from Telelogic of Irvine Calif. Active links can be established so that changes in one of the tools automatically propagate into changes in the other.

Stateflow® is a graphical modeling environment that enables development of state diagram models that can be graphical representations of state machines, such as either an infinite state machine, a finite state machine, or a non-deterministic state machine, where states and transitions form the building blocks of a system. Stateflow® can provide elements such as states, junctions, and functions, such as graphical functions of Simulink® and/or Stateflow® and can provide a graphical model or a block in a graphical model. A state diagram provided by Stateflow® can be restricted to represent a Moore or Mealy machine. Stateflow® further enables the generation of a hardware description representation of a state diagram and can restrict the hardware description language representation to a Moore or Mealy machine or can impose other restrictions. Stateflow® can also provide any other restrictions for the code generation process or in the development of the state diagrams. A user may also implement user specified states that contain programming language statements such as in C, or instructions in the technical computing language of MATLAB® as well as blocks from Simulink®.

The modeling environment 900 may also have a code building tool 960 to generate code, such as source code, object code, a compiled executable, and library, for forming an executable of a graphical model provided by the graphical modeling environment 910 or a textual model provided by the textual modeling environment. The code building tool 960 can also be used to generate a hardware description language representation of the models. The code building tool 960 may comprise a code building tool such as Real-Time Workshop® from The MathWorks, Inc. of Natick, Mass., or any portion thereof that may be necessary to generate executable code, instructions, etc. in a programming language such as C or a hardware description language such as Verilog or VHDL. The code building tool 960 can generate source code for the execution of a block diagram that is provided by the graphical modeling environment 910, compile the source code into object code and build an executable program, library or any other form of executable instructions. The code may be designed to run on any processor, microprocessor, dual-core processor, multi-core processor, cluster of processors, operating system, Field Programmable Gate Array (FPGA), Application Specific Integrated Circuit (ASIC), computational hardware device or component of a computational hardware device. In one embodiment, the code may comprise embedded code targeted to run on any type of embedded system. Additionally, the code can be customized to run on a specific target hardware platform.

One of ordinary skill in the art will also appreciate that the graphical modeling environment 910, simulation engine 930, textual modeling environment 950, and code building tool 960 may be provided on the same computing device, which is described above with reference to FIG. 7, or alternatively, the graphical modeling environment 910, simulation engine 930, and textual modeling environment 950 may be coupled to each other via a communication network, as illustrated in FIG. 8 and discussed in more detail below.

Aspects of the modeling environment, algorithm and architecture can be implemented in the network environment 840. For example, the servers 860 and 870 in the network environment 840 may provide the clients 880 and 890 with software components or products under a particular condition, such as a license agreement. The software components or products may include those for providing a modeling environment and a model created in the graphical modeling environment 900. The client 880 may build a model using a software component provided by the server 860 and send the server 860 the model.

The server 860 then executes the model and returns execution results to the client 880. The server 860 may also transform the model into a hardware description language representation of the model and may convert the model into the architecture provided by the illustrative embodiment of the present invention.

The modeling environment 900 of the illustrative embodiment uses the algorithm described herein to implement an architecture in a model to process multi-argument associative operations. Using the algorithm, the modeling environment 900 generates a plurality of components for performing the associative operations. For example, a user may want to implement the multi-argument associative operations in a model. The user can provide the modeling environment with the multi-argument associative operations and the modeling environment can implement the multi-argument associative operations as a model with an architecture that is determined by the algorithm of the illustrative embodiment. In one embodiment, the components for performing the associative operations can have an identifier that indicates whether the component performs an associative operation such that the algorithm can be applied to the component.

The architecture of FIG. 5 can be a model in a modeling environment. Each of the components 510, 520 and 530 of FIG. 5 can represent components for implementing operators to perform operations on the inputs in the model. The components represent operators for performing any associative operation such as addition, subtraction and multiplication. The steps in FIG. 6 depict the steps implementing the model.

Figure 10:
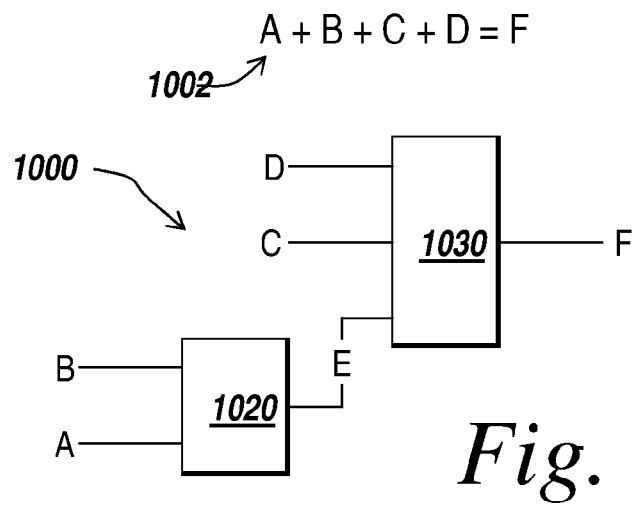
FIG. 10 illustrates a model that can be developed using the algorithm of the illustrative embodiment.
Figure 11:
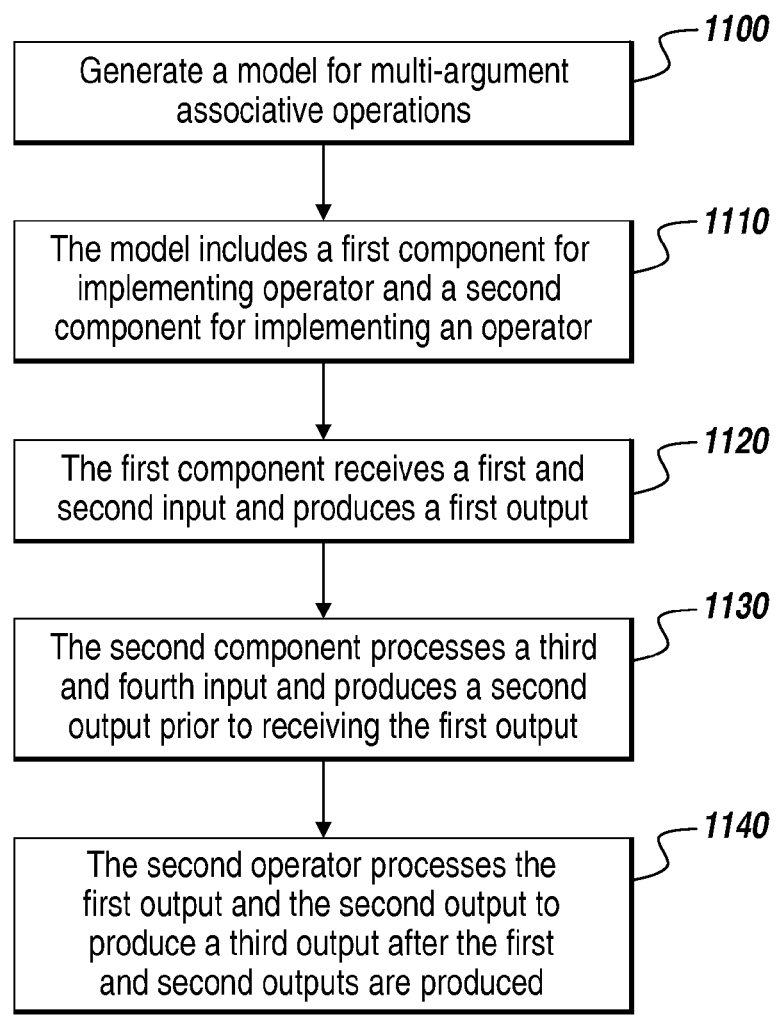
FIG. 11 is a flow diagram that illustrates the steps for implementing the model of FIG. 10.

FIG. 10 illustrates an example of another model that can be developed using the algorithm of the illustrative embodiment. The user can provide an expression 1002 to the modeling environment 900 and using the algorithm the modeling environment generates an architecture 1000 (step 1100). To do this, the algorithm determines the number of components that are required and the number of inputs that each component receives using the process described above. In this example, the expression 1002 represents a multi-argument expression of associative operations that has inputs A, B, C and D. The model generated with the algorithm includes a first component 1020 and a second component 1030 (step 1110). The components can represent elements of a model, such as, for example, blocks in a block diagram implemented in Simulink®. The first component receives the inputs A and B, and produces a first output E that is the sum of A and B (E=A+B) (step 1120). The second component 1030 includes three inputs C, D and E. The second component 1030 processes inputs C and D to produce a second output (not shown) prior to receiving the first output E from the first component 1020 (step 1130). Subsequently, the second component 1030 processes the output E and the second output to produce a third output F after the output E and second output are produced (step 1140).

In a model of a synchronous system, the components 1020 and 1030 can operate in synchronization with a clock signal. For example, during a first clock cycle the components 1020 and 1030 can produce the first output E and the second output and during a second clock cycle the component 1030 can produce the output F by summing the first output E and the second output.

In a model of an asynchronous system, the components 1020 and 1030 can operate asynchronously. For example, the component 1020 can process the inputs A and B when the inputs A and B are available for processing and the component 1030 can process the inputs C and D and the output E from the component 1020 when the inputs C and D and the output E are available for processing. Since the output E is the output of the component 1020, the component 1030 must wait for the output E to become available. While the component 1030 waits for the output E from the component 1020 to become available, the component 1030 processes the inputs C and D.

In the case of an asynchronous system, where there is no clock to synchronize the operation of the components 1020 and 1030, the components can provide a way to determine when the output E is available to be input to the component 1030. The component 1030 can continuously poll the input that receives the output E to determine when it is available or the components can have a handshake communication protocol. For example, when output E of the component 1020 is available the component 1020 can send an indicator that indicates the availability of the output E from the component 1020 to the component 1030. The component 1030 can respond to the communication from component 1020 by sending a communication to component 1020 that indicates whether or not the component 1030 is ready to receive the output E. If the component 1030 indicates that it is not ready for the output E, the component 1020 may wait a predefined time and then send the component 1030 another communication indicating the availability of the output E. This communication can repeat until the component 1030 is ready for the output E. Following the response from component 1030 indicating that the component 1030 is ready for the output, the component 1020 can send the component 1030 the output E. The communication between the components can be implemented by, for example, three value logic or an additional status signal such that specific logic values or status signals can be used to indicate whether or not an output is available or whether or not a component is ready for an output.

One skilled in the art will recognize that other implementations of asynchronous operations can be implemented in accordance with the present invention. For example, the component 1030 can send the component 1020 a communication that indicates that the component 1030 is ready for the output E from the component 1020. The component 1020 can respond to the component 1030 by sending the output E to the component 1030.

While the examples use the associative operation of addition, one skilled in the art will recognize that any other associative operations can be represented such as multiplication, subtraction and addition. Further, it is not necessary that all the components be the same so long as the result of the operations does not depend on the order in which the operations are completed. For example, the components can be a combination of addition and subtraction components since the order in which the addition and subtraction components are performed does not matter. Each input can be any bus width such as but not limited to 1, 2, 4, 8, 16, 32-bits.

In another example, operations can be provided that can include multiple operations that when combined, do not have associative properties such as addition and multiplication. To process these operations, the illustrative embodiment breaks the expression into subclasses of operations. For example, the algorithm can process the expression A*(B+C)+(D*E*F*G)+(H*I)=J. In this case, the algorithm can create subclasses to handle the associative operations of the expression. For example, a first subclass can be formed from D, E, F, and G, a second subclass can be formed from H and I, and a third subclass can be formed from B and C. This subclassing can be hierarchical, which is illustrated by the next level of subclassing where a fourth subclass is formed from A and the third subclass that is formed from B and C. The first, second, and fourth subclass then form a set of associative operations to which the algorithm can be applied. Similarly, the algorithm can be applied to the subclasses, for example, the first subclass formed from D, E, F, and G, which is a set of associative operations by itself. The architecture that is generated can thus place these subclasses in order such that the output is correctly calculated.

The user can provide a model with components having an architecture that represents multi-argument associative operations. For example, the user can provide the modeling environment 900 with a model that represents the multi-argument associative operations as a serial, tree, serial/tree architecture or any other architecture. Upon a request from the user, the modeling environment can operate to reconfigure at least a portion of the model to a new architecture using the algorithm. When the user provides the model to the modeling environment the modeling environment may process the model and determine that the number of components and/or the total latency of the associative operations in the model can be reduced using the algorithm. In this case, the modeling environment can prompt the user informing the user that the model can be reconfigured to reduce the number of components and/or the total latency of the associative operation.

Figure 12:
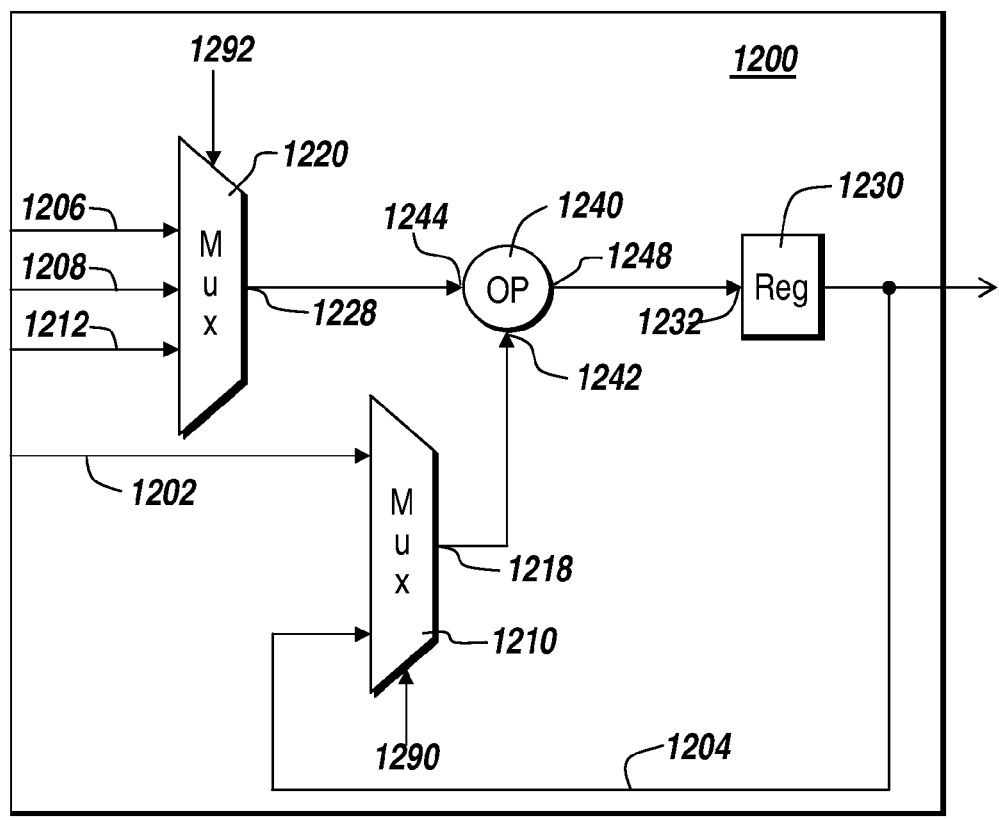
FIG. 12 illustrates an example of a structure of a component in accordance with the illustrative embodiment.

FIG. 12 illustrates an example of the structure of a component in accordance with the illustrative embodiment. The component 1200 includes a multiplexer (mux) 1210, a multiplexer (mux) 1220, a register 1230 and an operator 1240. The operator 1240 of the component 1200 can be any associative operation such as addition, subtraction and multiplication. The mux 1210 receives a first input 1202 and an output 1204 of the register 1230. The mux 1210 also receives a select signal 1290. The output 1218 of the mux 1210 is connected to a first input 1242 on the operator 1240. The mux 1220 receives a second input 1206, a third input 1208, a fourth input 1212 and a select signal 1292. The output 1228 of mux 1220 is connected to a second input 1244 on the operator 1240. The output 1248 of the operator 1240 is connected to an input 1232 of the register 1230.

In operation, the mux 1210 receives the first input 1202, and the select signal 1290 is set such that the first input 1202 is passed to the operator 1240. The select signal 1292 of the mux 1220 is set to pass the second input 1206 to the operator 1240. Upon receiving both input signals, 1202 and 1206, the operator 1240 calculates the output and passes that value on to the register 1230. Following this calculation the select signal 1290 for mux 1210 is set such that the output 1204 of the register 1230 is passed through the mux 1210 to the operator 1240. The selector signal 1292 on mux 1220 is set to let the third input 1208 pass through the mux 1220. The operator 1240 then calculates an output based on the output 1204 of the register 1230 and the third input 1208. Following the calculation, the output 1204 of the register 1230 is again passed through the mux 1210 to the operator 1240. The select signal 1292 for the mux 1220 is set to allow the fourth input 1212 to pass through the mux 1220 to the operator 1240. The operator 1240 calculates the output based on the fourth input 1212 and the output 1204 of the register 1230. By using the output of the register 1230 for each calculation except the first, the component 1200 provides a serial calculation.

Figure 13:
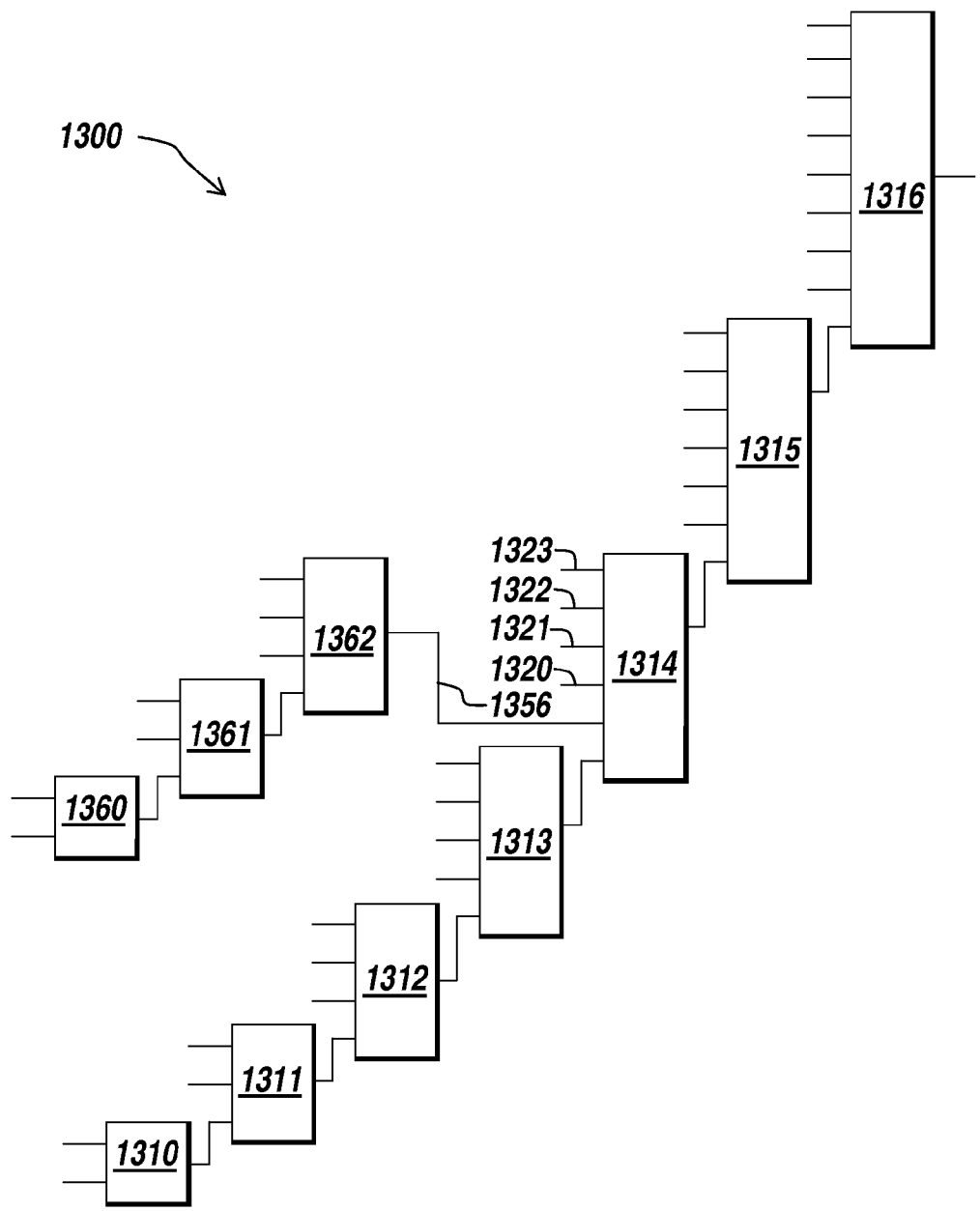
FIG. 13 illustrates another model that can be implemented using the algorithm and architecture of the illustrative embodiment.

FIG. 13 illustrates another model that can be implemented using the algorithm and architecture of the illustrative embodiment. The model 1300 includes components 1310-1316 and 1360-1362. The components 1310-1316 represent a multi-argument expression of associative operations that has thirty inputs. To generate these components the algorithm can process the multi-argument expression of associative operations and generate the vector, V=[9 7 6 5 4 3 2]. The components 1360-1362 may represent a multi-argument expression of associative operations that has eight inputs and can be generated using the algorithm. It is observed that an output 1356 of the component 1362 is received as input on component 1314 such that the output of the component 1314 is dependent on the output 1356 of the component 1362. In this manner, the modeling environment can create several hierarchies of components where the output of each of the hierarchy of components can be an input to another hierarchy of components.

Figure 14:
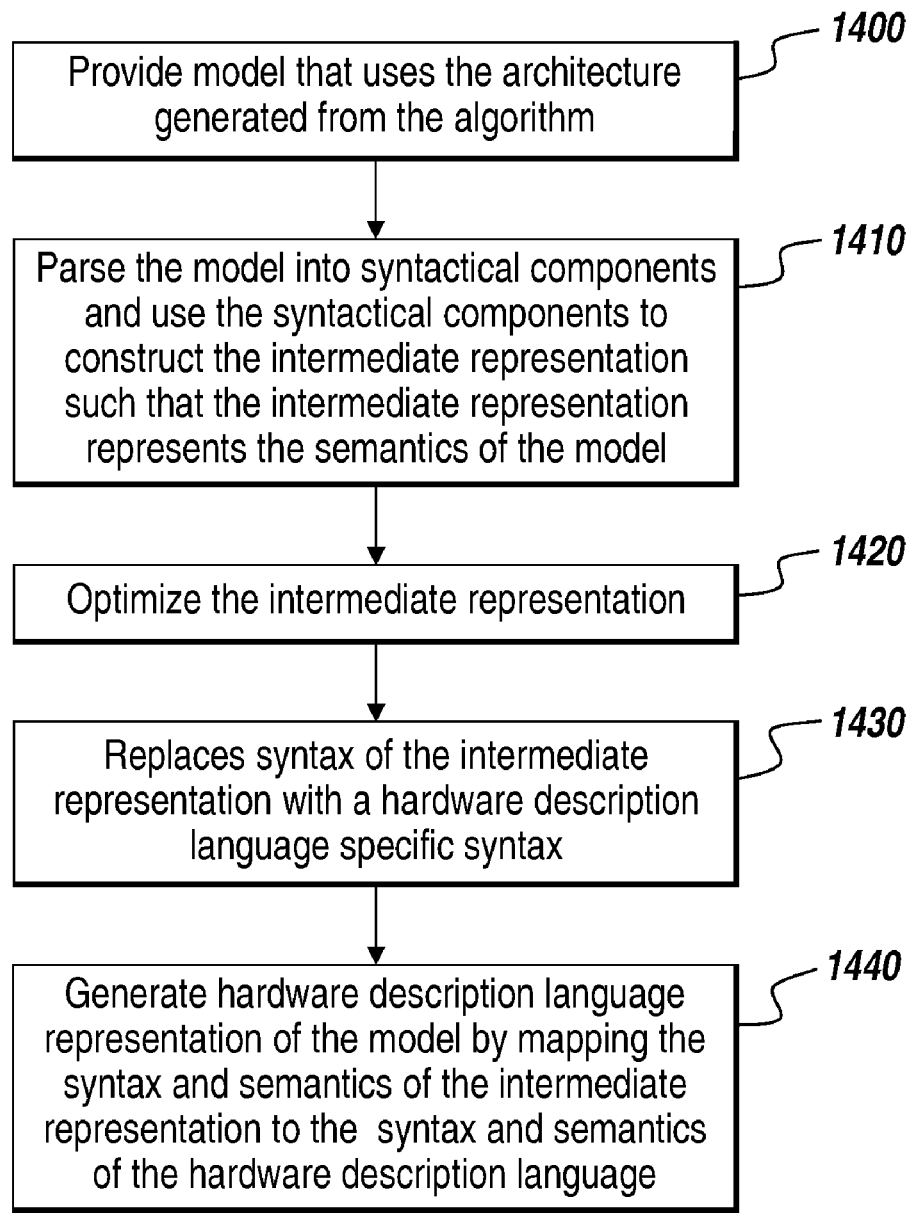
FIG. 14 is a flow diagram that illustrates the steps taken by the illustrative embodiment to convert a model that used the algorithm into a hardware description language representation of the model.

FIG. 14 illustrates a flow diagram for the steps provided by the illustrative embodiment for generating a hardware description language representation of a model. A user can develop a model, either graphical, textual or a combination thereof, that includes multi-argument associative operations or provide the modeling environment 900 with an expression that represents a multi-argument expression of associative operations. The modeling environment can convert the expression or the multi-argument associative operations of the model using the algorithm of the illustrative embodiment to a new architecture that uses the latency of the components of the model (step 1400). The model containing the new architecture can be converted into a hardware description language such as Verilog or VHDL.

The modeling environment may generate an intermediate representation from the model to use for generating the hardware description language representation of the model. To do this, the illustrative embodiment of the present invention can parse the model into syntactical components and use the syntactical components to construct the intermediate representation such that the intermediate representation represents the semantics of the model (step 1410). The intermediate representation can be optimized (step 1420), as discussed in more detail below. The intermediate representation is converted into a hardware description language representation of the model. The conversion to the hardware description language can replace syntax of the intermediate representation with a hardware description language specific syntax (step 1430). A hardware description language code that is representative of the model is generated by mapping the syntax and semantics of the intermediate representation to the syntax and semantics of the hardware description language (step 1440).

The conversion process can optimize the intermediate representation. In one example, the intermediate representation can be optimized using expression folding and constant propagation. Expression folding refers to reducing multiple expressions to a single expression. Constant propagation refers to replacing variables that reference a constant with the constant. A user can also supply additional functionality in the intermediate representation. As a result of the algorithm, the architecture resulting from the algorithm and the optimizations, the time necessary to execute the intermediate representation as well as the generated hardware description language representation of the model may be reduced. Further, the algorithm, the architecture resulting from the algorithm and the optimizations may reduce the memory size of the intermediate representation or the hardware description language representation of the model.

The generated hardware description representation of the model containing the new architecture that was generated using the algorithm may be implemented in a Field Programmable Gate Array (FPGA), Application Specific Integrated Circuit ASIC, programmable logic devices (PLCs) or any other devices allow configuration or reconfiguration of inputs, outputs and logic structures. As a result a user may configure and/or reconfigure hardware for connecting input/output devices such as signal conditioning hardware. This also enables a user who develops a model to implement the model with off the shelf components.

The algorithm of the illustrative embodiment can be used to reduce the physical area required to implement a model in a device of devices. This is because the algorithm minimizes the number of components without a substantial penalty in the total latency of the associative operations. By minimizing the number of components the algorithm can minimize the physical area required to implement a model. Further, by minimizing the number of inputs each component receives, the algorithm can provide a cost reduction for implementing the model created using the algorithm in the case where the cost of a component is proportional to the number of inputs.

The present invention may be provided as one or more computer-readable programs embodied on or in one or more mediums. The mediums may be, but are not limited to a hard disk, a compact disc, a digital versatile disc, a flash memory card, a PROM, a RAM, a ROM, a magnetic tape, or the genome in a cell nucleus. In general, the computer-readable programs may be implemented in any programming language. Some examples of languages that can be used include Python, FORTRAN, BASIC, C, C++, C#, or JAVA. Further, the computer readable programs can be implemented in a hardware description language or any other language that allows prescribing computation such as, for example, DNA. The software programs may be stored on or in one or more mediums as object code.

Certain embodiments of the present invention are described above. It is, however, expressly noted that the present invention is not limited to these embodiments, but rather the intent is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. In a computing system, a method for generating components for calculating an output of an associative operation, the method comprising:
    decomposing a number of inputs to the associative operation into a vector V, a number of elements in the vector representing a number of components used to calculate the output of the associative operation, values of the elements in the vector corresponding to a number of inputs for a corresponding component;
    processing the vector V to reduce a number of inputs to one or more of the components represented in the vector, the vector V satisfying the following conditions:
        the sum of the elements in the vector minus the length of the vector plus one equals the number of inputs to the associative operation, and
        the value of each element $A_k$ in the vector is greater than the value of the previous element $A_{k-1}$;
    generating a first component representative of an element in the vector V as part of a graphical model in a graphical modeling environment, the first component having at least two inputs, the first component producing a first output;
    generating a second component representative of an element in the vector V as part of the graphical model in the graphical modeling environment, the second component having at least three inputs, at least one of the at least three inputs being the first output of the first component, the second component:
        processing two of the at least three inputs to produce a second output prior to receiving the first output from the first component, and the second component;
        processing the first output and the second output to produce a third output after first and second outputs are produced; and
    generating a hardware description language representation of the first component and the second component.

2. The method of claim 1, wherein the method further comprises determining a computational complexity required to calculate the output of the associative operation using a number of arguments for the associative operation, and based on the computational complexity, minimizing a number of inputs to the first and second components and minimizing a total number of the components during the generating of the first component and the second component.

3. The method of claim 2, wherein the computational complexity is measured as the time required for calculating the output of associative operation.

4. The method of claim 1, further comprising:
    generating code to represent at least one of the first component and the second component.

5. The method of claim 4, further comprising:
    validating operation of the first component and the second component by simulating the graphical model.

6. The method of claim 1, further comprising:
    implementing the hardware description language representation by transferring the hardware description language representation to at least one of a configurable or reconfigurable electronic device.

7. The method of claim 1, wherein at least one of the inputs for at least one of the first component or the second component is a parallel input having a bus width greater than one bit.

8. The method of claim 1, wherein at least one of the first component and the second component performs at least one of addition, subtraction and multiplication.

9. A non-transitory computer-readable medium storing instructions for generating components for calculating an output of an associative operation, the instructions when executed causing a computer to:
    decomposing a number of inputs to the associative operation into a vector V, a number of elements in the vector representing a number of components used to calculate the output of the associative operation, values of the elements in the vector corresponding to a number of inputs for a corresponding component;
    processing the vector V to reduce a number of inputs to one or more of the components represented in the vector, the vector V satisfying the following conditions:
        the sum of the elements in the vector minus the length of the vector plus one equals the number of inputs to the associative operation, and
        the value of each element $A_k$ in the vector is greater than the value of the previous element $A_{k-1}$;
    generate a first component representative of an element in the vector V as part of a graphical model in a graphical modeling environment, the first component comprising at least two inputs, the first component being operable to produce a first output;

generate a second component representative of an element in the vector V as part of the graphical model in the graphical modeling environment, the second component comprising at least three inputs, at least one of the at least three inputs being the first output of the first component, the second component:

processing two of the at least three inputs to produce a second output prior to receiving the first output from the first component, and the second component;

processing the first output and the second output to produce a third output after first and second outputs are produced; and generating a hardware description language representation of the first component and the second component.

10. The medium of claim 9, wherein the instructions further cause the computer to determine a computational complexity required to calculate the output of the associative operation using a number of arguments for the operation, and based on the computational complexity, to minimize a number of inputs to the first and second components and to minimize a total number of components during the generating of the first component and the second component.

11. The medium of claim 9, wherein the instructions further cause the computer to:

generate code to represent at least one of the first component and the second component.

12. The medium of claim 9, wherein the instructions further cause the computer to:

simulate the graphical representation to validate operation of the components.

13. The medium of claim 9, wherein the instructions further cause the computer to:

implement the hardware description language representation by transferring the hardware description language representation to at least one of a configurable or reconfigurable electronic device.

14. The medium of claim 13, wherein the at least one of the first component or the second component performs at least one of addition, subtraction and multiplication.

15. A computer system for determining an architecture for calculating an output for one or more operations, the system comprising:

a processor for executing;
a modeling environment;
an architecture generator used by the modeling environment to generate a first component and a second component, the architecture generator:
decomposing a number of inputs to the associative operation into a vector V, a number of elements in the vector representing a number of components used to calculate the output of the associative operation, values of the elements in the vector corresponding to a number of inputs for a corresponding component and processing the vector V to reduce a number of inputs to one or more of the components represented in the vector, the vector V satisfying the following conditions:

the sum of the elements in the vector minus the length of the vector plus one equals the number of inputs to the associative operation, and
the value of each element $A_k$ in the vector is greater than the value of the previous element $A_{k-1}$;
the first component representative of an element in the vector V and comprising at least two inputs, the first component being operable to produce a first output; and
the second component representative of an element in the vector V and comprising at least three inputs, at least one of the at least three inputs being the first output of the first component, the second component being operable to process two of the at least three inputs to produce a second output prior to receiving the first output from the first component, and the second component being operable to process the first output and the second output to produce a third output after first and second outputs are produced.

16. The computer system of claim 15, wherein a computational complexity required to calculate the output of the one or more operations is determined using a number of arguments for the operations to minimize a number of inputs each component processes and to minimize a number of components required to produce the third output.

17. The computer system of claim 15, wherein the system further comprises:

a code generator to generate code to represent the behavior of the first component and the second component.

18. The computer system of claim 15, wherein the modeling environment is a graphical modeling environment and the components are represented in a graphical model.

19. The computer system of claim 15, wherein the code generator is operable to generate a hardware description language representation of at least one of the first component and the second component.

20. The computer system of claim 15, wherein the modeling environment is a textual modeling environment and the first component and the second component are represented by a textual model.

21. The computer system of claim 15, wherein the system further comprises:

a simulation engine for simulating the first component and the second component to validate their operation.

* * * * *